United States Patent
Behnke

[15] 3,662,414
[45] May 16, 1972

[54] THREADER DRIVE APPARATUS
[72] Inventor: Howard N. Behnke, San Gabriel, Calif.
[73] Assignee: Collins Machinery Corporation, Monterey Park, Calif.
[22] Filed: Aug. 11, 1970
[21] Appl. No.: 62,807

[52] U.S. Cl. .................................................10/89, 10/107
[51] Int. Cl. .....................................B23g 1/44, B23g 1/52
[58] Field of Search..................10/87, 89, 101, 105, 107

[56] References Cited

UNITED STATES PATENTS

| 3,231,913 | 2/1966 | Reinhardt | 10/89 |
| 3,413,667 | 12/1968 | Behnke | 10/89 |
| 3,445,871 | 5/1969 | Blake | 10/89 |
| 3,499,178 | 3/1970 | Blake | 10/89 |

Primary Examiner—Charles W. Lanham
Assistant Examiner—E. M. Combs
Attorney—White, Haefliger and Bachand

[57] ABSTRACT

Coupler mechanism including a drive shaft adapted for coupling a drive apparatus with a driven apparatus, the drive apparatus including actuator means rotatable in opposite directions and a series of jaws carried to be pivoted into engagement with the coupler drive shaft and to rotate the shaft forwardly in response to actuator means rotation in a forward rotation, the driven apparatus including an input member rotatable in opposite directions and structure responsive to member rotation in a forward direction to effect threading of a pipe, said mechanism comprising a. a connector to couple said drive shaft to said member, and b. retention means for blocking reverse pivoting of the jaws out of engagement with the drive shaft in response to actuator means rotation in a reverse direction.

8 Claims, 4 Drawing Figures

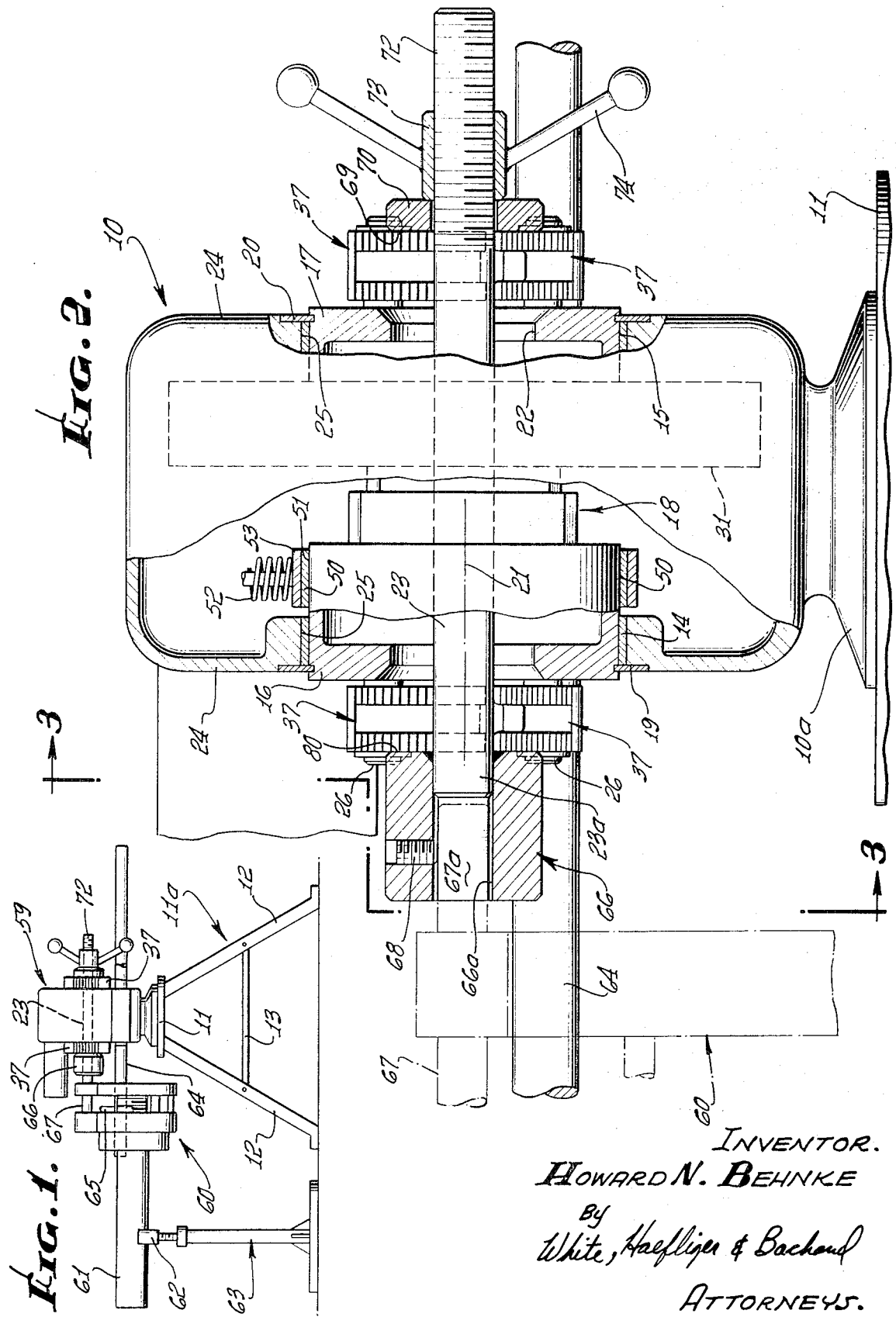

INVENTOR.
HOWARD N. BEHNKE
BY White, Haefliger & Bachand
ATTORNEYS.

THREADER DRIVE APPARATUS

BACKGROUND OF THE INVENTION

This invention relates generally to threading apparatus and more particularly concerns the threading of pipe of widely differing diameters.

Portable apparatus as described in U.S. Pat. No. 3,413,667 is useful in threading pipe that will fit within the space formed upon opening of pipe gripping jaws. Pipe of larger diameter may be threaded by auxiliary apparatus as will be described herein, that apparatus having a rotary drive input member. While it might appear that these two devices could be coupled together to handle pipe of a wide range of diameters, it has not been possible heretofore to accomplish this objective due to the operating characteristics of the portable apparatus as described in that patent. For example, the latter is able to transmit uninterrupted rotary drive in only one rotary direction, whereas, the auxiliary apparatus requires rotary drive input and both forward and reverse directions to accomplish both threading and release of the pipe of larger diameter.

SUMMARY OF THE INVENTION

It is a major object of the invention to provide mechanism capable of obviating the hiatus or problem described above. Basically the coupler mechanism of the invention includes a drive shaft adapted for coupling drive apparatus with driven apparatus, the drive apparatus including actuator means rotatable in opposite directions and a series of jaws carried to be pivoted into engagement with the coupler drive shaft and to rotate that shaft forwardly in response to actuator means rotation in a forward direction, and the driven apparatus including an input member rotatable in opposite directions and structure responsive to member rotation to effect threading of a pipe. The coupler mechanism includes, in this environment, a connector to couple the drive shaft to the input member; and retention means for blocking reverse pivoting of the jaws out of engagement with the drive shaft in response to actuator means rotation in a reverse direction. As a result, the jaws are enabled to transmit rotary drive in opposite directions via the drive shaft to the threader structure to meet its operational requirements.

Additional objects of the invention include the provision of retention means including clamping shoulders movable axially of the shaft axis into clamping engagement with the jaws; the provision of such shoulders in the form of a flange or sleeve on the shaft to engage certain jaws, and a washer movable axially of the shaft axis to engage others of the jaws; the provision of a nut having threaded engagement with the shaft to advance the washer axially of the shaft and thereby effect clamping of the jaws between the washer and sleeve or flange, as will appear.

These and other objects and advantages of the invention, as well as the details of an illustrative embodiment, will be more fully described in the following specification and drawings, in which:

DRAWING DESCRIPTION

FIG. 1 is a side elevation showing the complete assembly;
FIG. 2 is a vertical section taken through the FIG. 1 drive unit;
FIG. 3 is a section taken on line 3—3 of FIG. 2; and
FIG. 4 is a perspective showing of a coupler mechanism also seen in FIG. 2.

DETAILED DESCRIPTION

Figure 3:
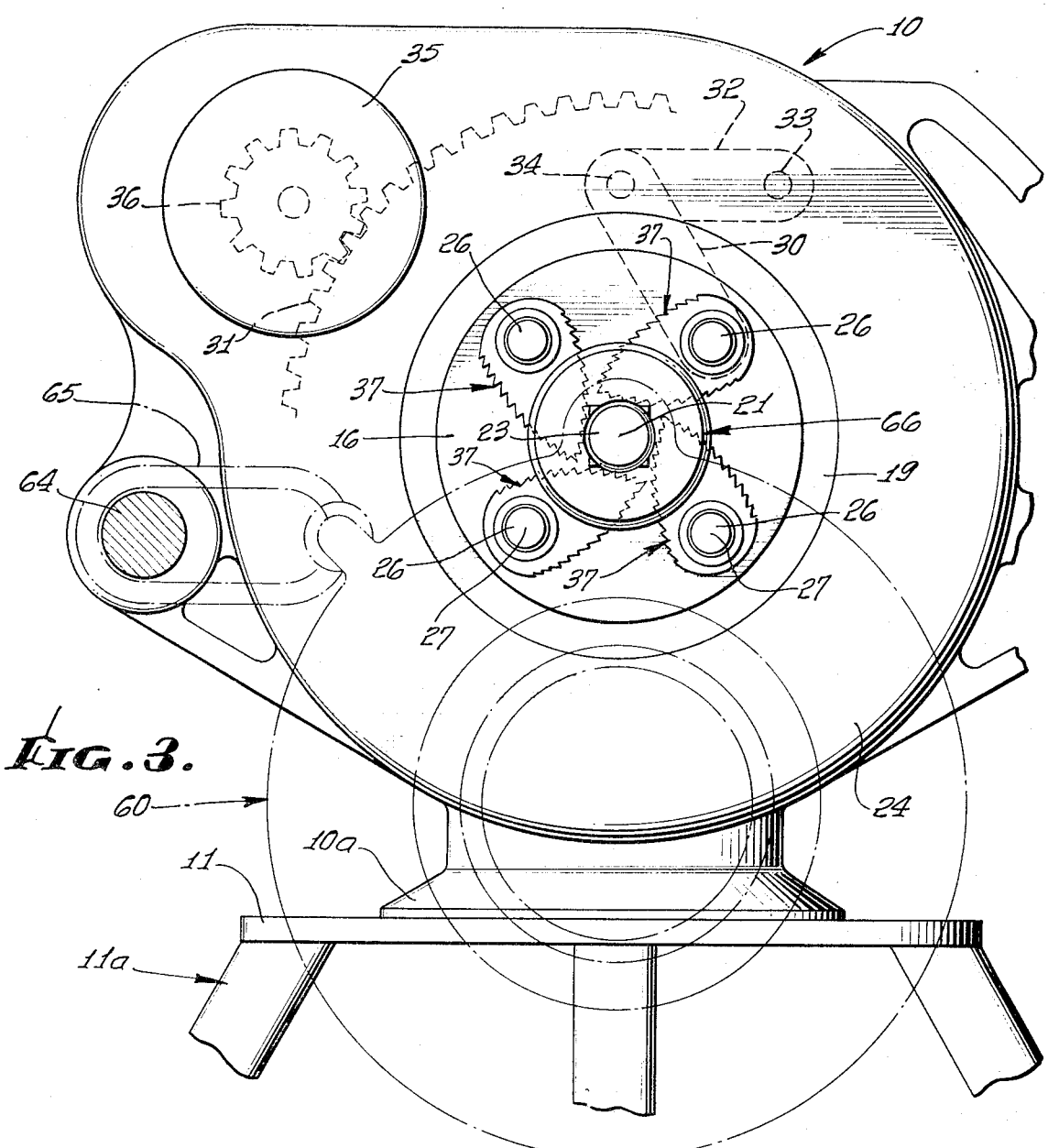
Figure 4:
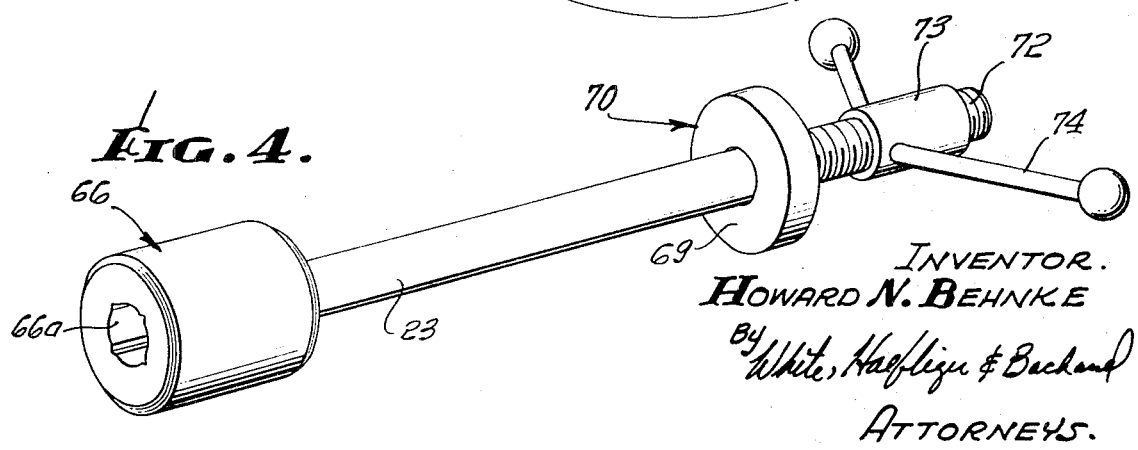

Referring to FIGS. 1 and 2, a housing 10 is shown as having a base 10a mounted on the table 1 of a tripod support 11a having legs 12 interconnected at 13 so as to be portable. The housing in turn supports internal annular bearings 14 and 15 respectively receiving left and right flanges 16 and 17 of a spindle or carrier 18. Retainer rings 19 and 20 carried by the housing engage the flanges to retain the carrier against endwise displacement within the housing.

The carrier has a horizontal central axis of rotation 21 and has a hollow bore 22 through which work such as the drive shaft 23 is insertible to be gripped, centered and rotated clockwise or counterclockwise, as will appear. Likewise, the end shrouds 24 of the housing have openings 25 to pass the work.

The carrier 18 supports parallel pivot members such as rods 26 having pivot axes 27 equally spaced at 90° intervals about the central axis 21, as better seen in FIG. 3. Like jaws 37 are attached to the extreme left and right ends of the pivot members, as by suitable keys, thereby to define left and right jaw sets, the jaws at opposite ends of any pivot member remaining in axial alignment. Levers or cranks 30 are attached as by keys to the pivot rods or members 26 at a location intermediate the flanges 16 and 17 as described in U.S. Pat. No. 3,413,667 for simultaneously rotating the pivot members in response to operation of a drive assembly. The latter includes a drive rotor in the form of a ring gear 31 supported by and rotatable relative to the carrier 18 and about central axis 21. Links 32 are pivotally connected at 33 and 34 to the drive rotor and levers 30 to transmit rotary drive from the rotor to the levers thereby to pivot the pivot members 26. The drive may also be considered to include a reversible electric motor 35 driving a pinion 36 meshing with the ring gear as seen in FIG. 3.

Normally, the jaws 37 are pivotable into and out of engagement with a pipe, not shown, which extends in the position of the shaft 23, in order to rotate the shaft for threading purposes, as explained in U.S. Pat. No. 3,413,667. Pivoting of the jaws, in response to rotation of the gear wheel 31, is facilitated by means frictionally resisting rotation of the carrier. Such means may take the form of the brake shoe 50 urged against the drum surface 51 of the spindle by the band 53. The latter is in turn urged by a spring 52. Jaw pivoting centers the shaft 23 (or pipe) so that the jaws then grip the centered shaft, following which the pivot rods 26 drive the spindle in rotation against resistance imposed by the brake, and the gripped shaft is thereby rotated.

The shaft 23 may be considered as part of coupler mechanism adapted for coupling the drive apparatus 59 described above with driven apparatus, the latter typically comprising a pipe threader seen at 60 in FIG. 1. A pipe to be threaded is seen at 61 in that Figure, and is supported for rotation (during threading) by bearing 62 on a stand 63. A horizontal rod, or rods, 64 carried by the apparatus 59 projects sidewardly of the threader unit 60 and is rearwardly coupled thereto, as by loop 65, to resist rotation of the threader which would otherwise result due to torque transmission to the threader via shaft 23. In this regard, the latter shaft has an end portion 23a attached as by welding to the coupler sleeve 66; and the square cross section end portion 67a of an input member 67 carried by the threader is received in the square cross section bore 66a of the sleeve, a set screw 68 holding the sleeve and end portions 23a and 67a assembled, as shown. The threader is also supported by this connection; to "hang" from shaft 23, whereby a very rapid connection and disconnection of the threader is afforded.

The threader is characterized as reversible, in that when input member 67 is rotated in one direction the pipe 61 to be threaded is advanced endwise and subjected to threading, whereas when member 67 is rotated in the opposite direction, the pipe 61 is retracted endwise for "unthreading" and removal from the threader. However, in the absence of the present invention, if ring gear 31 is rotated in the opposite direction, the shaft 23 is released by the jaws 37 so that reverse drive to the threader is interrupted; such jaw release is, however, desirable in the case where the threader 60 is not used, and pipe to be threaded in the manner described in U.S. Pat. No. 3,413,667 is to be inserted into the position of shaft 23. On the other hand, the latter mode of operation is limited to smaller diameter pipe, and use of the threader 60 becomes desirable where pipe of substantially larger diameter is to be subjected to threading.

In accordance with the invention; the coupler mechanism may be considered to include the shaft 23, and retention means for blocking reverse pivoting of the jaws 37 out of engagement with the drive shaft 23 in response to jaw actuator rotation (for example gear 31 rotation) in a reverse direction. The retention means typically may include the flange or sleeve 66 having a jaw clamping shoulder 80, and another jaw clamping shoulder, as for example is defined at 69 by washer 70 movable axially of the shaft axis into clamping engagement with the jaws, as seen in FIG. 2. The retention means may also include a thread 72 on the shaft 23 and a nut 73 subject to advancement on the thread to engage washer 70 and effect clamping of shoulders 69 and 80 against the jaws. Handle projections 74 on the nut facilitate such nut rotation and advancement.

As a result, the jaws 37, when engaged with the shaft 23 and when thereafter clamped as described, cannot be released from shaft engagement when the drive from ring 31 is reversed, whereby the rotary threader is enabled to function in reverse to release the pipe 61.

A typical threader 60 is identified as Model 141 a product of the Ridge Tool Company.

I claim:

1. In combination with a coupler mechanism, a drive apparatus, a driven apparatus, and a drive shaft coupling said drive apparatus with said driven apparatus, the drive apparatus including actuator means rotatable in opposite directions and a series of jaws pivotally carried by said drive apparatus to be rotated into engagement with said drive shaft and to rotate the shaft forwardly in response to actuator means rotation in a forward rotation, the driven apparatus including an input member rotatable in opposite directions and structure responsive to member rotation in a forward direction to effect threading of a pipe, said coupler mechanism comprising
   a. a connector to couple said drive shaft to said member, and
   b. retention means for blocking reverse pivoting of the jaws out of engagement with the drive shaft in response to actuator means rotation in a reverse direction.

2. The combination of claim 1 wherein said retention means is carried by said drive shaft.

3. The combination of claim 2 wherein said retention means includes clamping shoulders movable axially of the shaft axis into clamping engagement with the jaws.

4. The combination of claim 3 wherein said retention means includes a thread on the shaft and a nut subject to advancement on the thread to effect said shoulder clamping engagement with the jaws.

5. The combination of claim 3 wherein said shoulders are defined by a flange integral with the shaft to engage certain of the jaws, and a washer movable axially of the shaft to engage others of the jaws.

6. The combination of claim 1 wherein said shaft is coupled to said input member to support said driven apparatus.

7. The combination of claim 6 wherein said drive and driven apparatus include bodies, and including auxiliary structure interconnecting said bodies to block relative rotation of said bodies during transmission of rotation from said shaft to said input member 8. In combination,
   a. a drive shaft having an axis,
   b. first and second sets of rotatable drive jaws having axes of rotation parallel to said drive shaft axis and about which the jaws are rotated into engagement with the shaft at axially spaced locations,
   c. and means on the shaft axially clamping both sets of jaws in the direction of said drive shaft axis and blocking their rotary disengagement from the shaft,
   d. whereby the jaws may then be rotated in opposite directions about said axis to rotate the shaft in said opposite directions.

* * * * *